United States Patent [19]
Loan et al.

[11] Patent Number: 5,868,159
[45] Date of Patent: Feb. 9, 1999

[54] PRESSURE-BASED MASS FLOW CONTROLLER

[75] Inventors: James Loan, Mansfield, Mass.; John LeFavour, Litchfield, N.H.; D. Jeffrey Lischer, Acton, Mass.; Laura A. Sullivan, Sandown, N.H.; David Planchard, Hopkinton, Mass.

[73] Assignee: MKS Instruments, Inc., Andover, Mass.

[21] Appl. No.: 682,857

[22] Filed: Jul. 12, 1996

[51] Int. Cl.⁶ .................................................. F16K 49/00
[52] U.S. Cl. ...................... 137/334; 137/486; 137/487.5; 137/468; 73/861.52
[58] Field of Search .................................. 137/334, 486, 137/487.5, 468; 73/861.02, 204.12, 861.42, 861.52, 861.63

[56] References Cited

U.S. PATENT DOCUMENTS

| | | | |
|---|---|---|---|
| 2,929,248 | 3/1960 | Sprenkle | 73/861.52 |
| 3,220,256 | 11/1965 | Weichbrod | 73/861.52 |
| 3,488,996 | 1/1970 | Perehm | 73/861.02 |
| 3,851,526 | 12/1974 | Drexel | 73/202 |
| 4,464,932 | 8/1984 | Ewing et al. | 73/204 |
| 4,530,233 | 7/1985 | Kadi | 73/23 |
| 4,542,650 | 9/1985 | Renken et al. | 73/23 |
| 4,787,254 | 11/1988 | Duckworth | 73/861.61 |
| 4,972,707 | 11/1990 | Nijdam | 73/204.12 |
| 5,111,827 | 5/1992 | Rantala | 73/861.42 |
| 5,142,907 | 9/1992 | Hinkle | 73/204.12 |
| 5,295,397 | 3/1994 | Hall et al. | 73/861.02 |
| 5,313,955 | 5/1994 | Rodder | 73/861.52 |
| 5,343,758 | 9/1994 | Ingrain et al. | 73/861.02 |
| 5,347,843 | 9/1994 | Orr et al. | 73/861.52 |
| 5,365,795 | 11/1994 | Brower, Jr. | 73/861.63 |
| 5,445,035 | 8/1995 | Delajoud | 73/861.52 |
| 5,469,749 | 11/1995 | Shimada et al. | 73/861.63 |
| 5,533,412 | 7/1996 | Jerman et al. | 73/861.95 |
| 5,641,915 | 6/1997 | Ortiz et al. | 73/861.42 |

OTHER PUBLICATIONS

Sullivan et al. (Oct. 1986), "Flow Measurement and Control in Vacuum Systems for Microelectronics Processing", *Solid State Technology*, 29(10) pp. 113–118.

Sullivan (1993), "MKS Technical Report", MKS Instruments, Inc., Bulletin.

*Primary Examiner*—Denise L. Ferensic
*Assistant Examiner*—Joanne Y. Kim
*Attorney, Agent, or Firm*—Lappin & Kusmer LLP

[57] ABSTRACT

A pressure-based mass flow controller suitable for accurately monitoring and controlling the flow of many types of precursors characterized by vapor pressures ranging from approximately 2 torr or lower to at least 760 torr or higher at delivery temperatures of up to at least 250 degrees C. or higher for flow rates ranging from molecular to sonic. A flow restrictive element is installed in the precursor flow path, and the pressures of the fluid upstream and downstream of the flow restrictive element are measured. The ratio of the upstream and downstream fluid pressures is computed and compared to a value stored in the memory of a CPU associated with the controller to determine whether the flow is choked or non-choked. The mass flow of the precursor fluid is then computed by the CPU in accordance with a linear function of the upstream pressure, for choked flow, and in accordance with a nonlinear function of both the upstream and downstream pressures, for non-choked flow.

15 Claims, 2 Drawing Sheets

PRESSURE-BASED MASS FLOW CONTROLLER

FIELD OF THE INVENTION

The present invention relates to the field of fluid flow measurement and control and, more particularly, to a pressure-based mass flow controller for accurately controlling the delivery of gases from a variety of liquid and solid precursors.

BACKGROUND OF THE INVENTION

In the semiconductor manufacturing industry, it is necessary to achieve precise control of the quantity, temperature and pressure of one or more reactant materials which are delivered in the gaseous state to a reaction chamber. Some process reactants, such as nitrogen gas, are relatively easy to deliver in a controlled manner at the temperatures and pressures required for the reaction to occur. Other reactants, however, may be highly corrosive, toxic, pyrophoric, or unstable at the temperatures and/or pressures at which delivery to the reaction chamber is required. Such characteristics of the reactants make their accurate and controlled delivery to a reaction chamber extremely difficult to achieve.

Mass flow controllers (hereinafter, "MFCs") are widely used in the industry to control the delivery of process reactants. Two broad categories of MFCs, thermal and pressure-based, have been developed to handle the diverse delivery requirements of a wide variety of process reactants. Thermal mass flow controllers operate on the principle that the rate of heat transfer from the walls of a flow channel to a fluid flowing in laminar flow within the channel is a function of the difference in temperatures of the fluid and the channel walls, the specific heat of the fluid, and the mass flow rate of the fluid. Thus, the rate of mass flow of a fluid (in the laminar flow regime) can be determined if the properties of the fluid and the temperatures of the fluid and tube are known.

Thermal MFCs generally include one or more heating elements wound around a relatively narrow, thin-walled tube through which a laminar fluid flow is established and maintained. The heating elements generally have a high thermal coefficient of resistance and thus also accurately sense the temperature of the fluid in the tube. As long as laminar flow is maintained, the mass flow rate of the fluid can be accurately determined from changes in resistance of the heating elements in response to changes in the temperature of the fluid as it flows through the tube.

Thermal MFCs have some inherent limitations which make them unsuitable for use with certain reactants or under certain flow conditions. For example, reactants which have relatively low vapor pressures, i.e., below about 100 torr, or which thermally decompose at relatively low temperatures, i.e., below 100 to 150 degress C., cannot be controllably delivered in vapor form with thermal MFCs. Such reactants form gases which are unstable at the pressures and temperatures at which delivery is required and are thus likely to decompose or condense in the delivery lines prior to reaching the process chamber. In addition, the response of a thermal MFC to changes in fluid flow rate may be relatively slow due to the thermal characteristics of the tube and the time required for the fluid to reach equilibrium temperature distribution conditions as flow rate changes occur. This slow response can be alleviated somewhat by maintaining a constant temperature profile about the tube. A thermal MFC which uses three heating elements to establish a known temperature profile of the fluid and provide an output signal which is linearly proportional to mass flow rate is disclosed in U.S. Pat. No. 4,464,932 to Ewing et al.

On the other hand, pressure-based MFCs operate on the principle that changes in fluid pressure induce deflections in a deformable electrode, the deflections causing corresponding changes in the electrical capacitance of the deformable electrode and a stationary one coupled therewith. Pressure-based MFCs, which include, for example, capacitance manometer pressure transducers, are capable of controllably delivering process reactants at inlet pressures of less than 1 torr to greater than atmospheric pressure (760 torr).

Distinct flow regimes of a flowing fluid are recognized and defined by different pressure profiles within the fluid. Molecular flow occurs at fluid pressures of less than about 1 torr, and the flow rate of a fluid through a flow restrictive device, such as a nozzle, in the molecular flow regime is proportional to the pressure drop across the flow restrictive device. Laminar flow occurs at fluid pressures of greater than about 10 torr, and the flow rate of a fluid through a flow restrictive device in the laminar flow regime is proportional to the difference of the squares of the upstream and downstream pressures.

The pressure-based mass flow controllers disclosed in, for example, U.S. Pat. No. 3,851,526 to Drexel and U.S. Pat. No. 5,445,035 to Delajoud operate on the assumption that the fluid flow remains laminar. This assumption of laminar fluid flow limits the utility of these pressure-based MFCs to laminar flow conditions and leads to inaccuracies when such MFCs are used to characterize non-laminar flows.

In another pressure-based mass flow controller, exemplified by the Model 1150 mass flow controller manufactured and sold by the assignee of the present invention, the necessity for assuming laminar flow is avoided by creation of a viscous choked flow condition in the system. To establish viscous choked flow, two pressure reservoirs are created along the flow path of the fluid, for example, by introducing a restriction in the diameter of the flow path using means for defining a flow restrictive aperture, such as an orifice or nozzle. In the reservoir upstream of the flow restrictive aperture the fluid has a pressure $p_1$ and a density $\rho_1$, and in the reservoir downstream of the flow restrictive aperture the fluid has a pressure $p_2$ and a density $\rho_2$. As can be seen in the graph of FIG. 1, the relationship between mass flow of a fluid and the fluid pressure upstream of a flow restrictive device is linear above a certain critical pressure and nonlinear below that critical pressure. More specifically, when the upstream pressure $P_1$ is at least twice as great as the downstream pressure $P_2$ (i.e., $P_1/P_2 \geq 2$,) the flow is said to be choked, and the flow rate is a function only of $p_1$, $\rho_1$ and the cross-sectional area A of the flow restrictive aperture. In general, choked flow is typically established by maintaining the upstream fluid supply at a pressure that is always at least about twice that of the fluid in the downstream processing chamber. In a choked flow regime, as the pressure of the fluid in the upstream reservoir increases, the density and flow rate of the fluid also increase.

As shown in the graph of FIG. 1, this relationship between flow rate and upstream pressure is linear so long as the upstream pressure remains at least twice that of the downstream pressure. However, when the upstream pressure is less than twice the downstream pressure (i.e., $P_1/P_2 < 2$), the flow is said to be unchoked and the relationship between mass flow rate and downstream fluid pressure is nonlinear.

The pressure at which a precursor fluid (typically a gas) in the upstream reservoir of a choked flow system is maintained is, in part, a function of the vapor pressure of the precursor (liquid or solid) from which the gas is derived and the desired quantity of precursor to be delivered. Some precursors, typically liquids, used in vapor deposition processes have vapor pressures which are sufficiently high to ensure their delivery at a pressure which establishes choked flow and thus allows accurate measurement of mass flow. Other precursors, particularly low vapor pressure liquids and non-dissolved solids which must be sublimed to provide reactants in gaseous form, typically cannot be delivered at a sufficiently high pressure to ensure choked flow. As a result, the mass flow rate of such precursors cannot be accurately or reliably determined.

Until the present invention, no special provision has been made to permit a pressure-based MFC which has been calibrated for choked flow operation to operate in the non-linear, non-choked flow region. In the Model 1150 mass flow controller, for example, only the upstream fluid pressure is measured, although computer modeling is used to predict the mass flow in the non-linear range. In known choked-flow devices any measurements of flow rate have been assumed to be linearly related to the upstream pressure, as seen by the dotted line A in FIG. 1, even though the upstream pressure is actually less than twice the downstream pressure. In the non-choked flow regime, i.e., when the upstream pressure is less than twice the downstream pressure, the flow rate of the fluid varies as a function of the downstream fluid pressure and is independent of the upstream fluid pressure.

A need remains, therefore, for a mass flow controller which is suitable for use in the delivery of many types of precursor materials over a relatively wide range of operating temperatures, pressures and flow rates, without the need for frequent recalibration.

OBJECTS OF THE INVENTION

One object of the present invention is to provide a pressure-based mass flow controller suitable for use with precursor materials characterized by a wide range of vapor pressures at the delivery temperature.

Another object of the present invention is to provide a pressure-based mass flow controller suitable for use with materials having relatively low vapor pressures and maintained at relatively high temperatures.

Another object of the present invention is to provide a pressure-based mass flow controller which has high accuracy throughout an extended range of both high and low flow rates.

And another object of the present invention is to provide a mass flow controller suitable for use with a wide variety of precursor materials, both solid and liquid, without the need to know specific properties, such as density and viscosity, of the precursor material.

Yet another object of the present invention is to provide a pressure-based mass flow controller for measuring and controlling mass flow at a precisely controlled temperature without the requirement of long lengths of heated lines.

And yet another object of the invention is to provide a pressure-based mass flow controller capable of accurately measuring and controlling fluid flow in both the choked and non-choked flow regimes.

And still another object of the present invention is to provide an improved mass flow controller for accurately controlling the delivery of a precursor over a wide range of flow rates, even with precursors that have a relatively low vapor pressure.

And yet another object of the present invention is to provide a pressure-based mass flow controller which can be used with a variety of different precursor materials and which is self-calibrating for such materials over a wide range of temperatures, pressures and flow rates.

SUMMARY OF THE INVENTION

The present invention provides a pressure-based mass flow controller useful for delivery of gases derived from a broad range of liquid and solid precursor materials, and particularly suitable for those materials for which the maintenance of choked flow conditions over the entire flow rate range of interest is difficult or impractical because of the relatively low pressures at which such materials are delivered to the reaction chamber. No prior knowledge of precursor properties, such as viscosity and density, is necessary for use of the present invention. The pressure-based MFC of the present invention is compact and is suitable for use with, for example, a vapor deposition apparatus used in the microelectronics industry for manufacture of semiconductor devices. The MFC is designed to provide accurate measurement of mass flow rates for both choked and non-choked flow conditions so as to provide a greater range of accuracy and control over a wide range of flow rates.

In accordance with one aspect of the invention, the pressure-based mass flow controller for measuring the mass flow of a fluid in a flow path comprises:

means for defining a flow restrictive aperture in the flow path so as to define (1) an upstream reservoir and a downstream reservoir in the flow path on opposite sides of the aperture, (2) choked flow conditions when the pressure of the fluid in the upstream reservoir is above a critical pressure as a function of the pressure of the fluid in the downstream reservoir, and (3) non-choked flow conditions when the pressure of the fluid in the upstream reservoir is below the critical pressure;

means for measuring the fluid pressure in each of the reservoirs; and means for determining the mass flow rate of the fluid during choked flow conditions in accordance with a linear function of the fluid pressure in the upstream reservoir, and for determining the mass flow rate of the fluid during non-choked flow conditions in accordance with a non-linear function of the fluid pressure in each of the reservoirs.

In accordance with another aspect of the invention, there is provided a pressure-based mass flow controller for, and a method of, accurately measuring and controlling the flow rate of precursor materials under non-choked flow conditions at predetermined temperatures.

In accordance with another aspect of the invention, a control unit and control valve are used in combination with the MFC for accurately controlling the delivery of a precursor material to, for example, a processing chamber, such as a vacuum deposition chamber.

The mass flow controller of the present invention is thus designed to measure and control mass flow for both choked and non-choked flow conditions, and accordingly includes means for measuring the pressure of the fluid in both the upstream and downstream reservoirs to determine whether the pressure of the fluid in the upstream reservoir exceeds the critical pressure required to establish choked flow conditions. If the pressure of the fluid in the upstream reservoir exceeds or is equal to the critical pressure, then choked flow conditions exist and the mass flow is a linear function of the pressure of the fluid in the upstream reservoir. If the pressure of the fluid in the upstream reservoir is below the critical pressure, then non-choked flow conditions exist and the mass flow is a non-linear function of the pressures of the fluid in both the upstream and downstream reservoirs.

When the pressure of the fluid in the upstream reservoir is equal to or above the critical pressure, establishing that choked flow conditions exist, the mass flow rate is proportional to the upstream fluid pressure and is expressed by the equation:

$$q = cP_1 \tag{1}$$

wherein q is the mass flow rate; c is a constant; and $P_1$ is the (absolute) upstream fluid pressure. More specifically, $$q = CAP_1 \sqrt{\frac{1}{MR_uT} \cdot k \cdot \left[\frac{2}{k+1}\right]^{\frac{k+1}{k-1}}} \tag{2}$$

wherein q is the mass flow rate; C is the discharge coefficient of the flow restrictive aperture; A is the cross-sectional area of the flow restrictive aperture; $P_1$ is the upstream fluid pressure; M is the molecular weight of the fluid; $R_u$ is the universal gas constant; T is the temperature of the fluid; and k is the specific heat ratio ($C_p/C_v$) of the fluid.

When the pressure of the fluid in the upstream reservoir is less than the critical pressure, then non-choked flow conditions exist and the mass flow rate is proportional to the product of the upstream fluid pressure and a function of the ratio of the downstream and upstream fluid pressures, expressed by the equation:

$$q = cP_1 \cdot f(P_2/P_1), \tag{3}$$

or, more completely as:

$$q = CAP_1 \sqrt{\frac{2}{MR_uT} \cdot \frac{k}{k-1} \cdot \left[\left(\frac{P_2}{P_1}\right)^{\frac{2}{k}} - \left(\frac{P_2}{P_1}\right)^{\frac{k+1}{k}}\right]} \tag{4}$$

wherein q is the mass flow rate; C is the discharge coefficient of the flow restrictive aperture; A is the cross-sectional area of the flow restrictive aperture; $P_1$ is the upstream fluid pressure; M is the molecular weight of the fluid; $R_u$ is the universal gas constant; T is the temperature of the fluid; k is the specific heat ratio ($C_p/C_v$) of the fluid; and $P_2$ is the downstream fluid pressure.

The means for determining the mass flow rate of the fluid is preferably a central processing unit (CPU) associated with the controller (and preferably integral therewith). The CPU receives and analyzes the output signals from the respective pressure measuring devices and determines whether the flow is choked or non-choked. The CPU then computes the mass flow rate of the fluid according to the appropriate equation.

BRIEF DESCRIPTION OF THE DRAWINGS

The foregoing and other features and advantages of this invention will be better understood from the following detailed description taken with the accompanying drawings, in which.

DETAILED DESCRIPTION OF THE DRAWINGS

Figure 1:
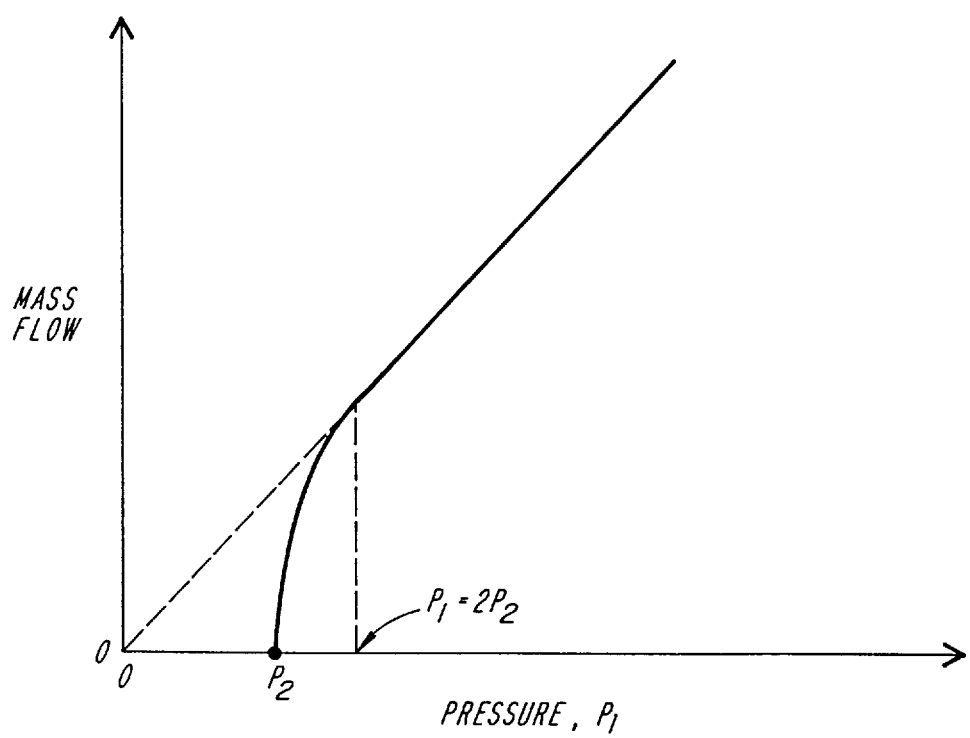
FIG. 1 is a graph illustrating the relationship of mass flow and the pressure drop of a fluid across a flow restrictive element defining an upstream and downstream reservoir. The graph illustrates both choked and non-choked flow conditions.
Figure 2:
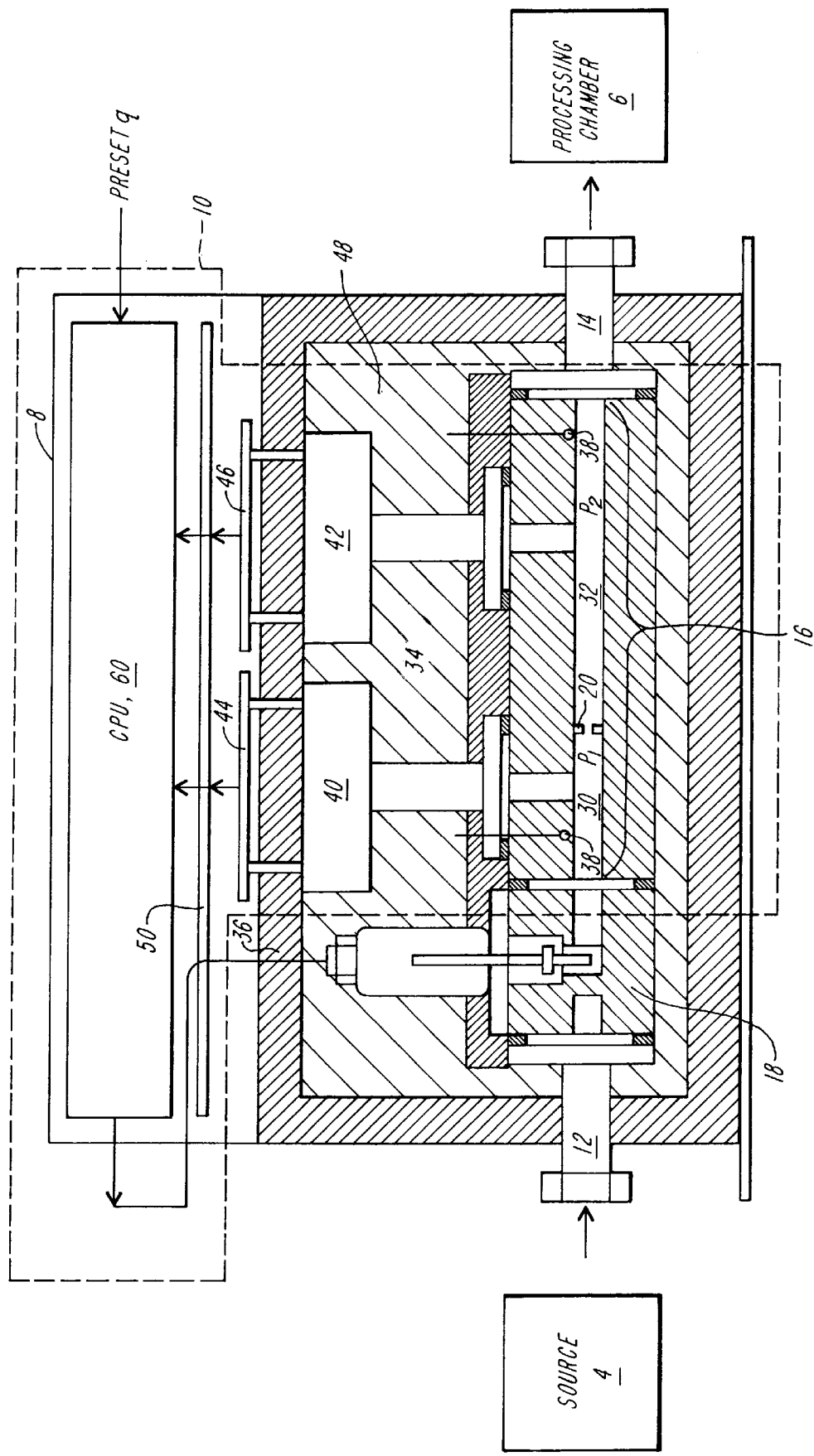
FIG. 2 is a simplified schematic diagram of a pressure-based mass flow controller according to the invention.

Referring to FIG. 2, the preferred mass flow controller 10 includes (a) inlet means 12 for introducing a gas into the device, the inlet means being adapted for connection to a source of gas 4, and (b) outlet means 14 from which the gas exits, the outlet means being adapted for connection to a processing chamber 6. Means, preferably in the form of a conduit, for defining a flow path 16 is provided between, and couples, the inlet means 12 and outlet means 14. The flow path 16 is maintained at a constant temperature preferably by surrounding the flow path with temperature control means. The latter preferably includes thermal insulating means 48, and may also include a heater, heater controls and heating block, shown generally at 34, and one or more temperature sensors 38 for sensing the temperature(s) along the flow path and for operating the heater in a feedback arrangement so as to maintain the temperature of the flow path at a predetermined fixed temperature.

Flow restrictive element 20 divides the flow path 16 into an upstream reservoir 30 and a downstream reservoir 32, in such a way that when the ratio of the pressure $P_1$ of the gas in the upstream reservoir relative to the pressure $P_2$ of the gas in the downstream reservoir is greater than the so-called critical pressure (which occurs at a ratio of upstream pressure $P_1$ to downstream pressure $P_2$ of about 2:1), choked flow conditions are maintained, and when the ratio of $P_1/P_2$ is less than the critical ratio, non-choked flow conditions exist. The size of the flow restrictive element 20 is initially determined by the fluid pressure at the inlet means 12 (from source 4) and the fluid pressure at the outlet means 14 (in chamber 6), and clearly can be adjusted from the initial values.

A first pressure measuring means 40 is in fluid communication with upstream chamber 30, and a second pressure measuring means 42 is in fluid communication with downstream chamber 32. The pressure measuring means 40 and 42 can be any type of pressure transducer capable of measuring fluid pressures within the range of interest. For example, each pressure measuring means can include an absolute pressure transducer.

First pressure measuring means 40 is connected to temperature control and circuit means 50 and to computer processing unit (CPU) 60 through first pressure measuring circuitry 44. Similarly, second pressure measuring means 42 is connected to temperature control and circuit means 50 and to CPU 60 through second pressure measuring circuitry 46. Control valve 18 is also connected to receive an appropriate output signal from the temperature control means and circuit board from the CPU 60.

In accordance with the present invention, CPU 60 is programmed to determine the mass flow of the gas through flow path 16 in both the choked and non-choked flow regimes. The CPU 60 computes mass flow: (a) as a function of the fluid pressure $P_1$ in the upstream reservoir 30 as measured by the first pressure measuring means 40 when the difference in fluid pressures in the upstream and downstream reservoirs, as measured by the first pressure measuring means 40 and second pressure measuring means 42, respectively, indicates that choked flow conditions exist, and (b) as a function of the upstream fluid pressure and the ratio of the fluid pressures in the upstream and downstream reservoirs, as measured by first pressure measuring means 40 and second pressure measuring means 42, respectively, when the difference in pressures indicates that non-choked flow conditions exist. The controller 10 is designed to provide an output signal which is compared to a set point in a feedback loop which controls the operation of the control valve 18 in the flow path between the inlet means 12 and the controller 10 to maintain the desired flow at all times.

Control valve 18 may be any kind of valve for controlling the flow of fluid through the flow path in response to a control signal provided from the CPU 60. Preferably, the controller and CPU accommodate all flow rates from a complete shut off position (providing zero flow) to a complete open position (providing maximum flow), including flow rates required for choked as well as non-choked flow, although under certain applications it may be desirable to design the controller 10 for only one flow regime. The specific characteristics of the valve chosen as control valve 18 will depend on the expected delivery pressure range of the precursor material and the dimensions of the elements defining the flow path 16 through the flow restrictive element as described below, and can be, for example, as a solenoid valve, a throttle valve or a flapper valve.

The following equations for computing the mass flow rate from the measured pressures in reservoirs 30 and 32 form the preferred basis of the determination of mass flow rate performed by the CPU 60.

When $P_1/P_2$ is $\geqq$ the critical ratio (approx. 2:1), then choked flow conditions exist and the mass flow rate is linearly proportional to the fluid pressure in the upstream reservoir:

$$q = cP_1 \tag{5}$$

wherein q is the mass flow rate; c is a constant; and $P_1$ is the upstream pressure. More specifically:

$$q = CAP_1 \sqrt{\frac{1}{MR_uT} \cdot k \cdot \left[\frac{2}{k+1}\right]^{\frac{k+1}{k-1}}} \tag{6}$$

When $P_1/P_2$ is less than the critical ratio, then non-choked flow conditions exist and:

$$q = cP_1 \cdot f(P_2/P_1), \tag{7}$$

or, more completely as:

$$q = CAP_1 \sqrt{\frac{2}{MR_uT} \cdot \frac{k}{k-1} \cdot \left[\left(\frac{P_2}{P_1}\right)^{\frac{2}{k}} - \left(\frac{P_2}{P_1}\right)^{\frac{k+1}{k}}\right]} \tag{8}$$

In these equations, q is the mass flow rate; C is the discharge coefficient of the flow restrictive element; A is the cross-sectional area of the flow restrictive element 20; $P_1$ is the fluid pressure in the upstream reservoir; M is the molecular weight of the fluid; $R_u$ is the universal gas constant; T is the temperature of the fluid; k is the specific heat ratio ($C_p/C_v$) of the fluid; and $P_2$ is the fluid pressure in the downstream reservoir.

Pressure measuring devices 40 and 42 independently measure the respective pressures $P_1$ and $P_2$, and the output signals are compared by the CPU to determine whether the flow is choked or non-choked. From that determination, the CPU determines the mass flow rate of the fluid with the appropriate equation.

The CPU either stores or accepts input of values for the parameters C, A, M, R, T and k. For example, the cross-sectional diameter of the aperture in the flow restrictive element 20 is typically input by the operator to provide a value for A and, indirectly, C. Values of M, R and k for several precursor gases may be input or stored in the CPU memory. Values of the fluid temperature T may be input by the operator or, preferably, received directly as an output signal from the heating element 34.

The desired flow rate can be entered into the CPU 60 through the use of a keyboard and monitor (not shown), or via an analog set point, to provide a preset flow rate q, as indicated in FIG. 2. The preset rate can be in accordance with any function of time, such as a fixed rate for a predetermined period time, or a varying rate over time for a predetermined period of time.

The determination by the CPU 60 of the mass flow rate also forms the basis of a feedback loop for adjusting control valve 18 in response to changes in fluid pressure within the upstream chamber 30 and/or the downstream chamber 32 to ensure that the actual flow rate is the same as the preset flow rate. The CPU 60 accomplishes this task by comparing the preset value of the flow rate with the measured value of the flow rate. Information on flow rate as a function of the valve control current is stored in the CPU memory in order to quicken the response time of the system. In addition, the CPU 60 employs feedback control loops for accurately controlling the temperature of the fluid (and for maintaining the temperature of the flow path at a predetermined temperature) in response to changes in fluid flow. Signals sent from the heater element 34 to the CPU operate to controllably adjust the temperature of the tube and, thus, of the fluid flowing therein, as a function of the temperature sensed by each of the temperature sensors 38. A predetermined temperature setpoint or range can be programmed into the CPU to ensure that the fluid is maintained at the desired temperature or range. The CPU preferably uses PID control loops for accurately controlling both flow rate and temperature.

By providing accurate flow rate measurement for non-choked flow conditions, the pressure-based mass flow controller of the present invention can be used to deliver gaseous reactants from liquid and non-dissolved solid precursors characterized by a wide range of vapor pressures at the delivery temperatures.

Thus, the pressure-based mass flow controller of the present invention may be used to monitor and control the delivery of vapors to a reaction chamber in a variety of industrial applications, including the manufacture of semiconductor devices using precursor materials having relatively low vapor pressures. Such precursor materials include liquid precursors having low vapor pressures and solid precursors which sublime, i.e., enter the gaseous state directly from the solid state. Alternatively, the solid precursor materials may be melted at an appropriate temperature and the mass flow of the gaseous reactants derived therefrom may be determined using the apparatus and process of the present invention, without the use of a solvent. As a consequence, the pressure-based MFC of the present invention is particularly suitable for use in systems that require delivery of gaseous reactants of high purity to a processing chamber. In addition, the pressure-based MFC of the present invention effectively and more reliably models the relationship between upstream fluid pressure and mass flow rate, since it is capable of determining and controlling mass flow rate with high accuracy and fast response time over a wide range of flow rates in both the choked and non-choked flow regimes for a wide variety of precursor fluids.

Other advantages of the pressure-based mass flow controller of the present invention include the versatility of the unit. A single MFC according to the invention can be used in applications in which, formerly, several MFCs, each calibrated for a particular gas, temperature, pressure and/or a particular flow rate range, were required. For example, the MFC can be used to control the flow rate of a vapor derived from a precursor characterized by a vapor pressure ranging as low as 2 torr or lower, to at least 760 torr or higher, at temperatures of up to at least 250° C. or higher. In addition, the pressure transducers, heating element, CPU, valves and controlling circuitry which comprise the MFC are provided in a relatively compact, integral unit. Furthermore, the calibration and computations are performed in-line by the CPU. The feedback control loops are digitally controlled for improved accuracy and response time; however, both analog and digital operation is permitted. The on-board calibration feature of the present invention provides additional accuracy and reliability, as calibration of the system can be done at multiple increments of full scale readings instead of merely at 0 and 100 percent full scale. In addition, calibration of the individual components, namely, the pressure transducers, is not required.

Although a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A device for measuring the mass flow of a fluid in a flow path, the device comprising:

means for defining a flow restrictive aperture in said flow path so as to define (1) an upstream reservoir and a downstream reservoir in the flow path on opposite sides of said aperture, (2) choked flow conditions when the pressure of the fluid in the upstream reservoir is above a critical pressure defined as approximately twice the pressure of the fluid in the downstream reservoir, and (3) non-choked flow conditions when the pressure of the fluid in the upstream reservoir is below the critical pressure;

means for measuring the fluid pressure in each of said reservoirs; and means for determining the mass flow rate of the fluid during choked flow conditions in accordance with a linear function of the pressure in said upstream reservoir, and for determining the mass flow rate of the fluid during non-choked flow conditions in accordance with a nonlinear function of the pressure in each of said reservoirs.

2. The device according to claim 1, further including a conduit for defining said upstream and downstream reservoirs in the flow path, wherein said means for defining said flow restrictive aperture in said flow path includes a flow restrictive element disposed in said conduit.

3. The device according to claim 1, further including means for controlling the temperature of said flow path.

4. The device according to claim 3, further including means for maintaining the temperature of the fluid in said flow path substantially constant.

5. The device according to claim 1, wherein said means for measuring the fluid pressure in each of said reservoirs includes two pressure transducers for measuring the respective pressures in the upstream and downstream reservoirs.

6. The device according to claim 5, wherein each of said pressure transducers is an absolute pressure transducer.

7. The device according to claim 1, further including means for controlling the mass flow rate through the flow path as a function of the determined mass flow rate and a predetermined desired flow rate.

8. The device according to claim 7, wherein said means for controlling the mass flow rate includes a control valve.

9. The device according to claim 8, wherein said control valve is connected between a source of the fluid flowing through said flow path and said upstream reservoir.

10. The device according to claim 1, wherein said means for determining the mass flow rate during choked flow conditions determines mass flow rate in accordance with the following equation:

$$q = CAP_1 \sqrt{\frac{1}{MR_uT} \cdot k \cdot \left[\frac{2}{k+1}\right]^{\frac{k+1}{k-1}}}$$

and during non-choked flow conditions said means determines mass flow rate in accordance with the following equation:

$$q = CAP_1 \sqrt{\frac{2}{MR_uT} \cdot \frac{k}{k-1} \cdot \left[\left(\frac{P_2}{P_1}\right)^{\frac{2}{k}} - \left(\frac{P_2}{P_1}\right)^{\frac{k+1}{k}}\right]}$$

wherein q is the mass flow rate of the fluid, C is the discharge coefficient of the flow restrictive element, A is the cross-sectional area of the flow restrictive aperture, $P_1$ is the pressure of the fluid in the upstream reservoir, M is the molecular weight of the fluid, $R_u$ is the universal gas constant, T is the temperature of the fluid, k is the specific heat ratio ($C_p/C_v$) of the fluid, and $P_2$ is the pressure of the fluid in the downstream reservoir.

11. A mass flow controller for controlling the flow rate of a vapor derived from a precursor characterized by a vapor pressure ranging from about 2 torr or lower at a predetermined delivery temperature, the controller comprising:

a) means for defining a flow path;

b) flow restrictive means for producing a pattern of flow of the vapor through a restrictive element disposed in the flow path, wherein the restrictive element includes an aperture so that the vapor flows in accordance with (1) choked flow conditions when the ratio of the pressure of the vapor on the upstream side of the aperture to the pressure of the vapor on the downstream side of the aperture is greater than a predetermined critical ratio defined as approximately 2 to 1, and (2) non-choked flow conditions when the ratio of the pressure of the vapor on the upstream side of the aperture to the pressure of the vapor on the downstream side of the aperture is less than the predetermined critical ratio;

c) a first pressure transducer for measuring the pressure ($P_1$) of the vapor upstream of the restrictive element;

d) a second pressure transducer for measuring the pressure ($P_2$) of the vapor downstream of the restrictive element;

e) valve control means, responsive to a control signal, for controlling the flow of the vapor along the flow path to the first pressure transducer; and f) means for generating the control signal, including (1) means for determining from the measurement of $P_1$ and $P_2$ whether the flow in the flow path is choked flow or non-choked flow, (2) means for determining the mass flow rate of the vapor during choked flow in accordance with a linear function of $P_1$, and for determining the mass flow rate of the vapor during non-choked flow in accordance with a non-linear function of $P_1$ and $P_2$, and (3) means for generating the control signal as a function of the determined mass flow rate.

12. The controller of claim 11, wherein the precursor is a liquid.

13. The controller of claim 11, wherein the precursor is a non-dissolved solid.

14. The controller of claim 11, wherein said means for determining the mass flow rate during choked flow conditions determines mass flow rate in accordance with the following equation:

$$q = CAP_1 \sqrt{\frac{1}{MR_uT} \cdot k \cdot \left[\frac{2}{k+1}\right]^{\frac{k+1}{k-1}}}$$

and during non-choked flow conditions determines mass flow rate in accordance with the following equation:

$$q = CAP_1 \sqrt{\frac{2}{MR_uT} \cdot \frac{k}{k-1} \cdot \left[\left(\frac{P_2}{P_1}\right)^{\frac{2}{k}} - \left(\frac{P_2}{P_1}\right)^{\frac{k+1}{k}}\right]}$$

wherein q is the mass flow rate of the vapor, C is the discharge coefficient of the flow restrictive element, A is the cross-sectional area of the flow restrictive aperture, $P_1$ is the pressure of the vapor in the upstream reservoir, M is the molecular weight of the vapor, $R_u$ is the universal gas constant, T is the temperature of the vapor, k is the specific heat ratio ($C_p/C_v$) of the vapor, and $P_2$ is the pressure of the vapor in the downstream reservoir.

15. A process of delivering a vapor derived from a precursor characterized by a vapor pressure ranging from about 2 torr or lower at a predetermined delivery temperature, the process comprising the steps of:

(a) providing a source of the precursor vapor;

(b) establishing a flow path of the vapor from a source vessel through a control valve into a channel;

(c) installing a flow restrictive element within the flow path to establish a restriction in the flow path in the channel, thereby establishing (1) an upstream reservoir and a downstream reservoir in the channel on opposite sides of said flow restrictive element, (2) choked flow conditions when the pressure of the vapor in the upstream reservoir is above a critical pressure defined as approximately twice the pressure of the vapor in the downstream reservoir, and (3) non-choked flow conditions when the pressure of the vapor in the upstream reservoir is below the critical pressure;

(d) determining a first pressure value $P_1$ characteristic of the vapor contained in the first reservoir;

(e) determining a second pressure value $P_2$ characteristic of the vapor contained in the second reservoir; and (f) calculating the mass flow of the vapor in accordance with a linear function of the pressure of the vapor in the first reservoir when said choked flow conditions exist, and in accordance with a non-linear function of the pressure of the vapor in each of said reservoirs when said non-choked flow conditions exist.

* * * * *